Figure 1:
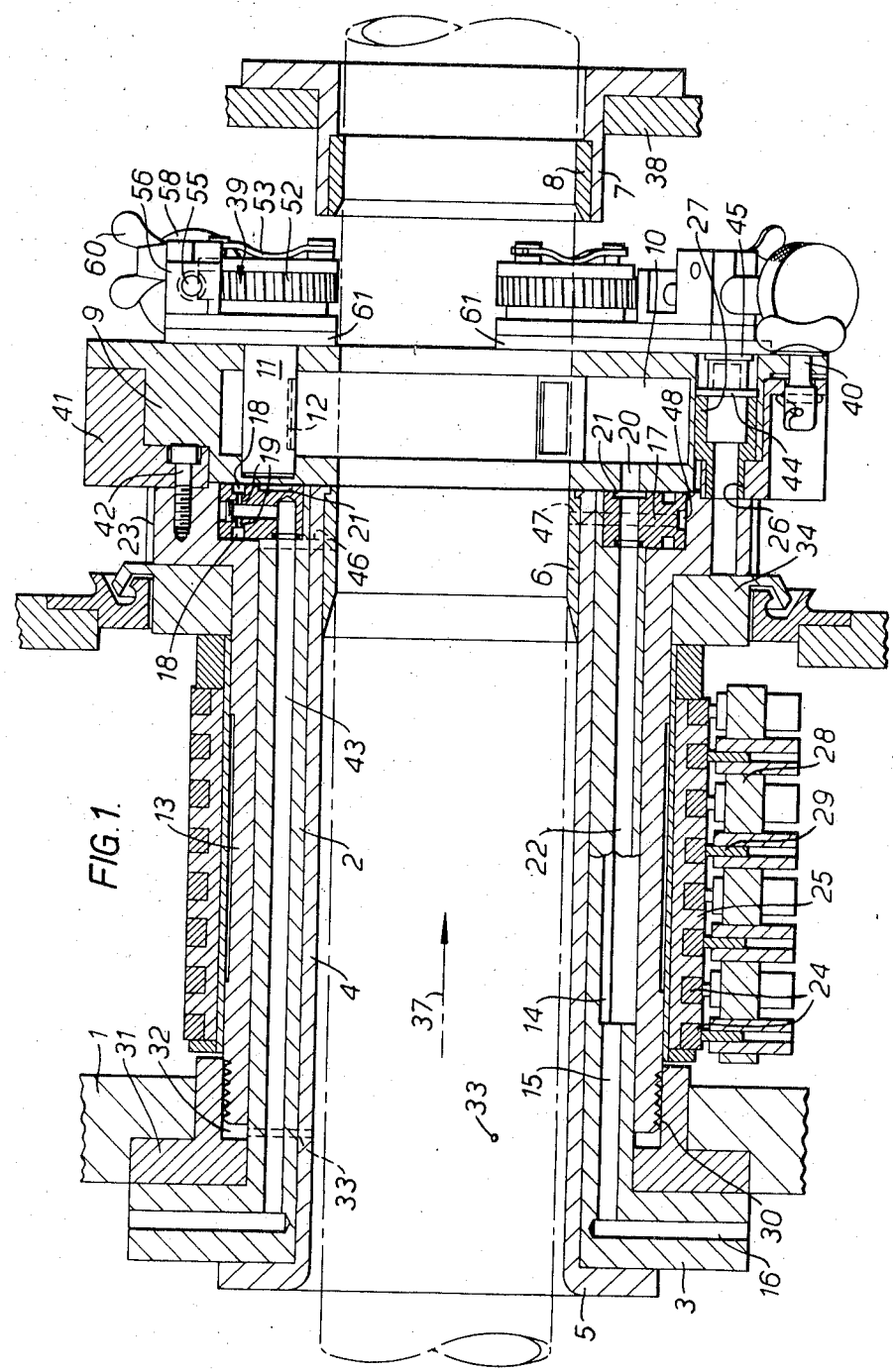

United States Patent
Hetherington et al

[11] 3,848,461
[45] Nov. 19, 1974

[54] ROTARY ULTRASONIC TESTING APPARATUS

[75] Inventors: Mathew James Hetherington, Near Market Harborough; Peter Atkinston, Stanion, nr. Kettering, both of England

[73] Assignee: British Steel Corporation, London, England

[22] Filed: May 30, 1973

[21] Appl. No.: 365,133

[30] Foreign Application Priority Data
June 8, 1972  Great Britain............... 26825/72

[52] U.S. Cl......................... 73/71.5 US, 73/67.8 S
[51] Int. Cl. ........................................ G01n 29/04
[58] Field of Search............. 73/67.5 R, 67.6, 67.7, 73/67.8 S, 67.9, 91.5 US

[56] References Cited
UNITED STATES PATENTS
| | | | |
|---|---|---|---|
| 3,501,947 | 3/1970 | Hetherington | 73/71.5 U |
| 3,533,281 | 10/1970 | Hetherington | 73/71.5 U |

FOREIGN PATENTS OR APPLICATIONS
| | | | |
|---|---|---|---|
| 1,165,742 | 10/1969 | Great Britain | 73/71.5 U |

*Primary Examiner*—Richard C. Queisser
*Assistant Examiner*—John P. Beauchamp
*Attorney, Agent, or Firm*—Bacon & Thomas

[57] ABSTRACT

Rotary ultrasonic testing apparatus of the kind used for example in testing steel tubes and including an ultrasonic probe assembly mounted for rotation so as to transcribe a close pitched helix about the body to be tested, in which the probe assembly is mounted for rotation on hydrostatic bearings.

6 Claims, 2 Drawing Figures

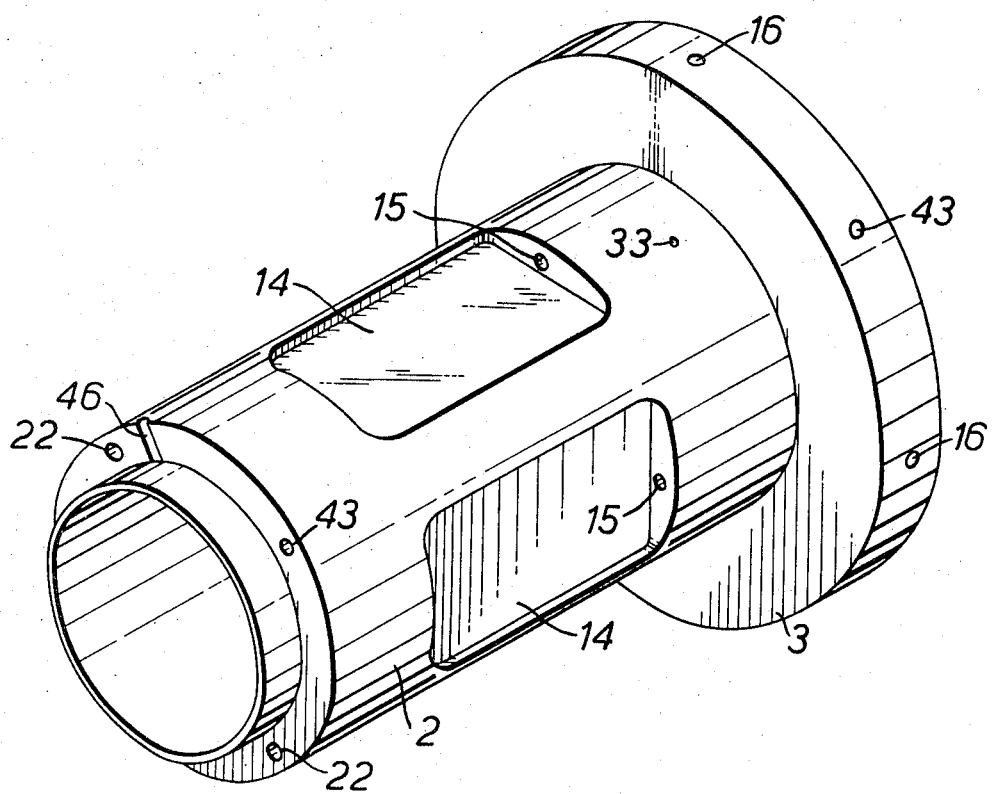

ROTARY ULTRASONIC TESTING APPARATUS

This invention relates to rotary ultrasonic testing apparatus of the kind used in testing steel tubes, for example, for flaws and dimensional accuracy by rotating an ultrasonic probe in a close pitched spiral about the tubes.

We have already proposed in our United Kingdom Pat. No. 1,038,491 that the probe or probes should be mounted for rotation on fluid bearings, and in our patent of addition Pat. No. 1,165,742 we have proposed that the fluid bearing should be a liquid.

Liquid bearing arrangements, in which the liquid, under pressure, forms a low friction film between opposed bearing surfaces of relatively moving members have been proposed in which the rotation of the probes is utilised to build up the required liquid pressure to enable operation of the liquid bearings. Whilst such bearings can be very effective once the probes are in rotation and operate with very little friction, there are problems during starting and stopping the rotation of the probes, since at such times the liquid bearings are ineffective. This is particularly a problem in apparatus using large, heavy rotary probe members liable to present considerable friction to movement in the absence of the liquid bearings.

According to the invention there is provided rotary ultrasonic testing apparatus including an ultrasonic probe assembly mounted for rotation so as to transcribe a close pitched helix about a tubular body to be tested, said probe assembly being mounted for rotation on a hydrostatic liquid bearing.

With a hydrostatic bearing, the probe assembly is supported at all times by the liquid bearing, and does not rely on rotation of the assembly to build up the required liquid pressure for liquid support of the assembly, since the required pressure is provided by the continual supply of liquid under pressure to the bearing members.

The hydrostatic liquid bearing may include a bearing surface having one or more recesses and liquid inlets opening into each of said recesses for supplying liquid under pressure into the recesses. The recessed bearing surface may be arranged to abut a non-recessed bearing surface, the liquid being forced by the supply pressure over the edges or sills of the recesses so as to provide a low friction liquid bearing film between the recessed surface and the non-recessed surface. Where the bearing uses more than one recess, the recesses may be connected to a common liquid source. In this case restrictors may be provided for limiting the flow of liquid to each of the recesses.

In order that the invention may be more fully understood, one embodiment thereof will now be described by way of example with reference to the accompanying drawings in which:

FIG. 1 is a sectional elevation of a rotary ultrasonic testing apparatus for testing steel tubes; and FIG. 2 is an isometric view of the stub axle of the apparatus shown in FIG. 1.

The rotary test apparatus illustrated is suitable, for example, for testing steel tubes of outside diameter between ½ inch and 2¼ inches and consists essentially of two main units: a stationary unit and a rotating unit. The stationary unit comprises a stainless steel support member 1 carrying a stator in the form of a bronze stub axle 2 having an annular flange 3. A removable stainless steel tube 4 fits within the stub axle 2 and has a flange 5 at one end abutting against the flange 3 of the axle 2. A tightly fitting but removable "Tufnol" (Registered Trade Mark) sleeve 6 is provided within one end of the tube 4, the sleeve 6 acting as a close tolerance guideway for tubes to be tested as they are passed through the apparatus. A stationary flanged tube 7 is mounted on a support 38 separate from but aligned with the tube 4. The flanged tube 7 is provided with a tightly fitting but removable inner "Tufnol" (Registered Trade Mark) sleeve 8 which acts as a close tolerance guideway for the tube to be tested.

The rotating unit of the apparatus includes a rotatable probe assembly ring 9 disposed coaxially between the tubes 4 and 7.

The ring 9 is provided with an annular chamber 10 within which are mounted four ultrasonic probe transducers 11 (one only of which is shown). These transducers comprise epoxy resin stud like members having shafts of circular cross-section, and a transducing crystal element 12 is mounted in the shaft of each transducer.

Each of the transducers 11 is mounted in the probe assembly for rotation about the longitudinal axis of the transducer. A worm and wormwheel mechanism 39 is provided for adjusting the rotational position of each transducer so that the transducer can be very accurately aligned and adjusted for the particular direction of ultrasonic wave transmission required.

The assembly ring 9 is connected by means of four quick release clips 40 (one only being shown) to an annular support ring 41. The ring 41 is, in turn, connected by screws 42 to an annular rotor sleeve 13 fitting around the stub axle 2 for rotation thereabout. A hydrostatic journal bearing is provided between the sleeve 13 and the axle 2, this bearing being provided by four generally rectangular shaped recesses 14 around the outer surface of the axle 2 (most clearly seen in FIG. 2). Each recess 14 is connected by means of an inlet orifice 15 to a water supply channel 16 in the flange 3.

In addition to the provision of a hydrostatic journal bearing for the rotating unit, the apparatus incorporates a hydrostatic thrust bearing arrangement to prevent axial movement of the rotating unit, the arrangement including a bearing ring 17 having an annular groove 18 on each side. The grooves 18 are connected through diametrically opposite water supply channels 43 (one only shown) by means of restricted orifices 19.

The bearing ring 17 is secured by screws (not shown) to the end of the stub axle 2 such that the grooved outer portion of one of its faces abuts against the end of the rotor sleeve 13, whilst the other grooved face abuts against one side of the ring 9.

In use, the ultrasonic transducers 11 are coupled to the tube to be tested via water, and to this end the annular chamber 10 is arranged to be filled and kept filled with water by means of a plurality of orifices 20 (one only shown) spaced around the ring 9 and connecting with an annular groove 21 formed in the end of the bearing ring 17. The annular groove 21 is, in turn, connected with two diametrically opposed water supply channels 22.

The rotor sleeve 13 is provided with a toothed flange 23 which in use is engaged by a driving belt (not shown) for rotation of the sleeve.

The rotor sleeve 13 carries an integral slip ring unit comprising eight slip rings 24 moulded into an annular block 25 of electrically insulating material. Each transducer 11 is connected to a separate pair of the rings 24 via electrical leads (not shown) passing through bores (not shown) in the sleeve 13, coaxial pin and socket connectors 44 and 45 (one set only shown) mounted respectively in an insulating support 27 fitting within a bore 26 in the support ring 41, and a board 61, and leads (not shown) printed on the outer surface of the board 61 from the socket 45 to the transducer. A brush assembly 28 carries brushes 29 connecting to the rings 24 whereby the probes are connected to an internal power source and monitoring unit.

It is necessary to ensure that in use no water from the liquid bearings or from the ultrasonic coupling arrangement leaks to the slip rings and brushes, and to this end water exhausting from the journal bearing at the flanged end is prevented from entering the slip ring area by means of a spiral thread 30 provided on the outer surface of the sleeve 13 running in a close fitting housing 31, the thread 30 being in such a sense as to retain the escaping water in the annular gap 32 at the end of the sleeve 31. To eliminate pressure build up within the gap 32, it communicates with the interior of the stainless steel tube 4 by means of bleed orifices 33.

At the other end of the journal bearing, the slip ring assembly is protected from the ingress of water by means of a thrower ring assembly 34 mounted on the rotor sleeve 13.

To eliminate liquid pressure build-up due to leakage from the hydrostatic bearings, bleed orifices 46 and 47 extend through the wall of the stub axle 2 to the interior of the sleeve 6, and from an annular groove 48 in the bearing ring 17 to the interior of the sleeve 6, respectively.

For the operation of the apparatus, water is supplied to the water supply channels 16 and 43, filling the recesses 14 of the journal bearing and the annular grooves 18 of the thrust bearing with water under pressure, so that the bearings are hydrostatically acting. Water escaping from the hydrostatic bearing bleeds through the orifices 33, 46 and 47, and in each case has the effect of pre-wetting a tube to be tested as it moves towards the rotating ring 9.

Water is also supplied to the supply channels 22 so that the annular chamber 10 in the ring 9 is provided with water via the annular groove 21 and orifices 20.

Once the hydrostatic bearings are acting, the rotor sleeve 13 and hence the transducer assembly, can be rotated. Because of centrifugal action, the annular chamber 10 will now completely fill with water, and the apparatus is ready to receive a tube for testing. This is fed into the apparatus in the direction of arrow 37.

The tube now passes through the rotating ring 9 and, because the annular chamber 10 is filled with water, it becomes immediately coupled, through the water, to the transducers 11, so that ultrasonic testing of the tube can commence at once.

We claim:

1. Rotary ultrasonic testing apparatus including an ultrasonic probe assembly mounted for rotation so as to transcribe a close-pitched helix about a tubular body to be tested, said probe assembly being mounted for rotation on a hydrostatic liquid bearing, said liquid bearing including at least one bearing surface having at least one recess and a liquid inlet opening into the recess for supplying liquid under pressure into the recesss, and a non-recessed bearing surface against which the recessed bearing surface is arranged to abut, llquid being forced in use by the supply pressure over the edges of the recess so as to provide a low friction bearing film between the recessed surface and the non-recessed surface.

2. Apparatus as claimed in claim 1 wherein the recessed bearing surface is provided with a plurality of recesses, the liquid inlets of which are connected to a common source of liquid under pressure.

3. Rotary ultrasonic testing apparatus including an ultrasonic probe assembly mounted for rotation so as to transcribe a close pitched helix about a tubular body to be tested, said probe assembly being mounted for rotation on a hydrostatic liquid bearing; in which said liquid bearing includes a stationary cylindrical member having at least one recess in the outer peripheral surface thereof; a rotatable annular sleeve fitting around the stationary cylindrical member, the inner surface of the annular sleeve being non recessed and abutting the outer peripheral surface of the cylindrical member, and the ultrasonic probe assembly being mounted upon the rotatable annular sleeve; and a liquid inlet to the recess in the outer peripheral surface of the cylindrical member for supplying liquid under pressure into the recess whereby in use the liquid under pressure provides a low friction bearing film between the outer peripheral surface of the cylindrical member and the inner surface of the sleeve.

4. Apparatus as claimed in claim 3 wherein a plurality of recesses are provided equi-spaced around the outer peripheral surface of the stationary cylindrical member.

5. Apparatus as claimed in claim 3 wherein four recesses are provided equi-spaced around the outer peripheral surface of the stationary cylindrical member.

6. Apparatus as claimed in claim 4 wherein each recess is generally rectangular in plan configuration.

* * * * *